June 16, 1925.
T. J. ALEXANDER
TRUCK
Filed March 15, 1924
1,542,023
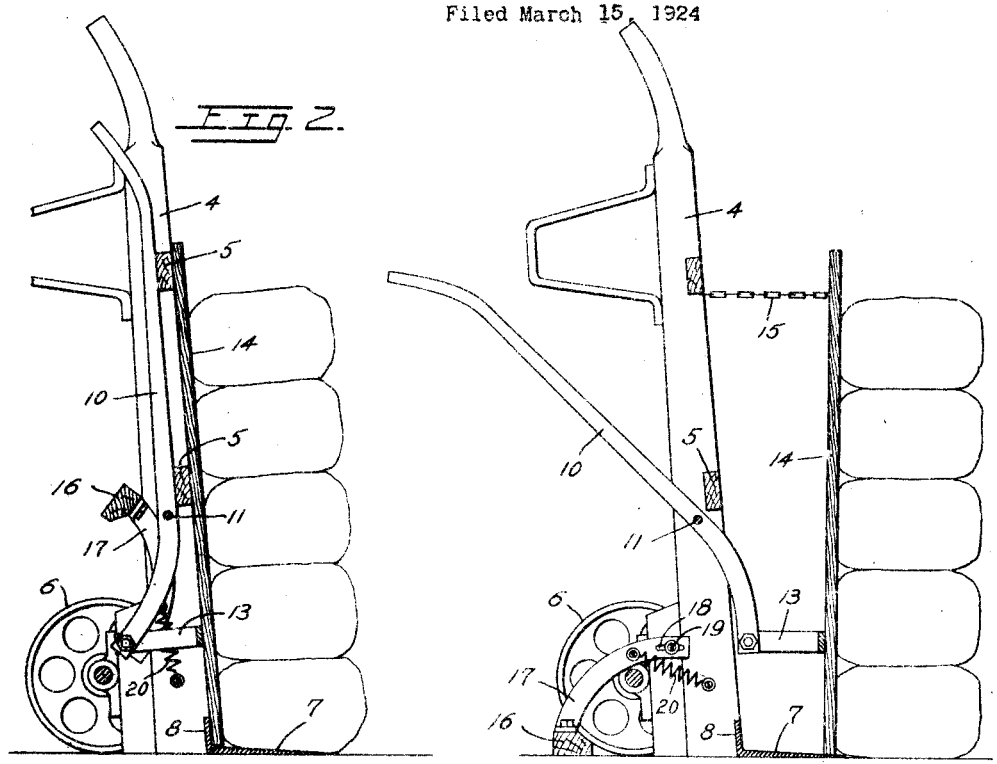
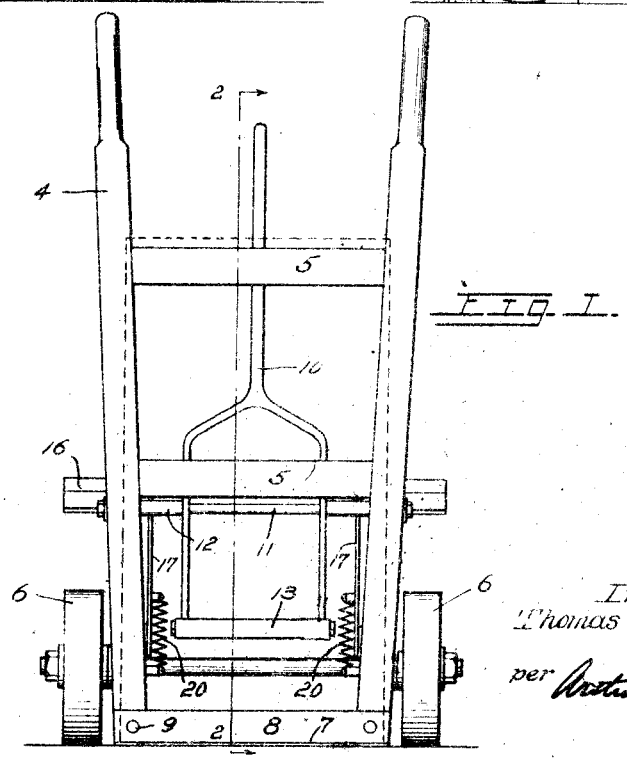
Inventor;
Thomas J. Alexander,
per Arthur J. Farnsworth.
Attorney.

Patented June 16, 1925.

1,542,023

UNITED STATES PATENT OFFICE.

THOMAS J. ALEXANDER, OF SELMA, CALIFORNIA.

TRUCK.

Application filed March 15, 1924. Serial No. 699,539.

*To all whom it may concern:*

Be it known that I, THOMAS J. ALEXANDER, a citizen of the United States, residing at Selma, in the county of Fresno and State of California, have invented a new and useful Truck, of which a specification is set forth below.

In this specification, and the accompanying drawing, I shall describe and show a preferred form of my invention, and specifically mention certain of its more important objects. I do not limit myself to the forms disclosed, since various changes and adaptations may be made therein without departing from the essence of my invention as hereinafter claimed; and objects and advantages, other than those specifically mentioned, are included within its scope.

My invention relates to trucks having load discharging means incorporated therein, particularly hand trucks used for warehousing and stevedoring purposes. My principal objects in the invention include: first, to provide a device of this nature that is especially adapted for rapid and convenient handling of sacks, as well as package or other freight; second, to furnish facilities for discharging the load in true vertical alignment so that the goods may be closely piled, and thus utilize the warehouse space to the fullest extent; third, to overcome the present necessity for tipping the load off the truck with the accompanying danger of breakage and disorderly arrangement of the goods; fourth, to secure greater ease of handling goods; and, fifth, to accomplish the above in a simple and rugged construction that may be depended upon to function in the manner intended.

My objects are attained in the manner illustrated in the accompanying drawing, in which—

Figure 1 is a front elevation of one form of my improved truck in discharging position, with the load board removed and only indicated by dotted lines;

Figure 2 is a side elevation in longitudinal section, taken on the line 2—2 of Fig. 1, showing a stack of sacks ready to be unloaded; and Figure 3 is a view similar to Fig. 2 after the sacks have been unloaded and the truck is disengaged.

Similar reference numerals refer to similar parts throughout the several views.

My invention is applicable to many kinds of hand trucks now in common use, and I have selected one of these for illustrative purposes. In this a pair of slightly diverging side members 4, suitably spaced by cross bars 5, constitute the frame. A pair of wheels 6 are journalled to the latter at the forward end. It is usual in such trucks to employ a U-shaped blade for picking up and retaining the load, but I have found that the use of this is very objectionable where sacks are to be handled, and that it is entirely unnecessary for other classes of freight.

In my truck I make use of a steel plate blade 7, tapered in section to a thin outer edge and having its other edge turned at nearly a right angle to form a flange 8. This flange can conveniently be attached to the truck frame by means of countersunk flushheaded bolts 9, and serves to stiffen the blade as well as the truck frame. I prefer to make the angle of this blade with respect to the truck frame somewhat greater than is usually the case, so that when the truck is in unloading position as shown, the inclination of the load departs very slightly from the vertical, and is less than the angle of repose. There is then no tendency for the load to slide off the blade. The use of the plate blade makes it impossible for the load to catch or stick when it is being unloaded.

A bifurcated unloading lever 10 is intermediately pivoted to the side members of the frame by the through bolt 11, tubular spacers 12 being employed to center it. The lower ends of the lever are pivotally connected to a U-strap 13 attached to the back of load board 14. The shapes, dimensions, and points of attachment of the unloading lever and U-strap are so chosen that the lever and load board will be parallel to each other and the frame of the truck when the latter is loaded as shown in Fig. 2. When it is desired to discharge the load, the truck being up-ended as in the figures, the unloading lever is pushed downward as in Fig. 3. This causes the load board to move forward with respect to the frame, and assume a vertical position, while pushing the truck backward from under the load. The latter is thus deposited in vertical alignment upon the warehouse floor.

A chain 15 connects the upper end of the load board to the frame for the obvious purpose of keeping the board from falling forward when the truck is backed away from the discharged load, but is not otherwise required. Its use could be dispensed with by placing the hand on the top edge of the board at that time.

It is to be noted in what has been said above, that the unloading action ordinarily is to push the truck backward from under the load upon its blade, rather than to push the load forward off of the blade. The load in the up-ended position of the truck is thus brought up to the point it is to be deposited and the truck blade is pushed out from under, leaving the load at the exact position desired. No tipping of the truck is required to free the blade in unloading. Also no straightening or re-arranging the pile is necessary after depositing, since it is discharged in perfect vertical alignment.

There are times when it may be desirable to depart from the above procedure and push the load off the blade. Furthermore there are times when it is desired to make use of the load board to straighten up a poorly deposited or disarranged pile, or to move it closer to the adjacent pile. For such purposes I have provided a special chocking device which co-operates with the other parts for securing such results.

The chocking device comprises a chock bar 16 attached to a pair of curved arms 17 having slots 18 at their outer ends. The arms are pivoted through their slots to the side members of the truck at 19. Tension springs 20 are attached to the arms and truck frame in such a way as to tend to keep the chock bar either in its upper position shown in Fig. 2, or its lower position shown in Fig. 3. In the latter case the springs tend to pull the chock bar under and against the wheels. Slots 18 permit of this being done irrespective of any lack of perfect adjustment or wear of the parts.

The wheels of the truck may effectively be chocked in the manner just described, and lever 10 may then be used to exert a strong uniform pressure upon the load for discharging it, or for straightening up a disarranged pile. The chock bar may be operated by the foot, either for raising or lowering it, and the springs will maintain it in either of its normal positions.

It will be apparent to those familiar with this art that my invention possesses many advantages for handling material conveniently and safely. There is no necessity for tilting the upended load to free the truck, or for jarring the load in depositing it. Breakage is thus largely eliminated. I particularly desire to call attention to the fact that warehouse space is much more fully utilized by the use of my improved truck on account of the accurate and very close piling made possible in the way described.

I claim as my invention:

1. A wheeled truck having a continuous load bed and adapted for being up-ended, and for discharging its freight in that position by forwardly projecting its load-bed.

2. A wheeled truck adapted for being up-ended, and for discharging its freight in that position by wholly advancing its load-bed with respect to its frame.

3. A wheeled truck adapted for being up-ended, and for discharging its freight in that position by forwardly projecting its load-bed; said truck having pivoted means for chocking its wheels while so discharging.

4. A wheeled truck adapted for being up-ended, and, in that position, for discharging its freight stacked in vertical alignment by forwardly advancing its load-bed; said truck having a slot-pivoted chock adapted for restraining its wheels while so discharging.

5. A wheeled truck adapted for being up-ended, and for discharging and vertically aligning its freight while in that position by forwardly advancing its load-bed; said truck having a slot-pivoted chock adapted for restraining its wheels while so discharging, and for normally remaining either in neutral or chocking position.

6. A wheeled truck adapted for being up-ended; and, while in that position, for discharging and vertically aligning freight by means of a lever operated load-bed that may be forwardly advanced from the truck frame; said truck having a slot-pivoted chock provided with spring means for normally holding it either in neutral or chocking position, and adapted for restraining the wheels of the truck while discharging or aligning freight.

THOMAS J. ALEXANDER.